(12) United States Patent
Mu (10) Patent No.: US 11,844,116 B2
(45) Date of Patent: Dec. 12, 2023

(54) RANDOM ACCESS METHOD AND APPARATUS (71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 19 days.

(21) Appl. No.: 17/642,497

(22) PCT Filed: Sep. 12, 2019

(86) PCT No.: PCT/CN2019/105798
§ 371 (c)(1),
(2) Date: Mar. 11, 2022

(87) PCT Pub. No.: WO2021/046828
PCT Pub. Date: Mar. 18, 2021

(65) Prior Publication Data
US 2022/0330349 A1 Oct. 13, 2022

(51) Int. Cl.
*H04W 56/00* (2009.01)
*H04W 74/08* (2009.01)
*H04W 72/1268* (2023.01)

(52) U.S. Cl.
CPC ... *H04W 74/0841* (2013.01); *H04W 72/1268* (2013.01); *H04W 74/0866* (2013.01)

(58) Field of Classification Search
CPC ............... H04W 56/005; H04W 56/00; H04W 72/1268; H04W 74/0833; H04W 74/0841; H04W 74/0866; H04W 74/08; H04W 72/12; G01S 13/003; G01S 13/765; G01S 13/767; G01S 13/87; G01S 13/00; G01S 13/76; G01S 5/02; H04L 43/0864
See application file for complete search history.

(56) References Cited

U.S. PATENT DOCUMENTS

| 2018/0279376 A1* | 9/2018 | Dinan | H04W 52/50 |
| 2020/0245373 A1* | 7/2020 | Xiong | H04L 27/2602 |
| 2020/0351801 A1* | 11/2020 | Jeon | H04W 52/48 |

(Continued)

FOREIGN PATENT DOCUMENTS

| CN | 108282895 A | 7/2018 | |
| WO | WO-2021026118 A1 * | 2/2021 | ........ H04W 74/0833 |

OTHER PUBLICATIONS

CATT: "Discussion on Channel Structure for 2-Step RACH", 3GPP Draft; R1-1902027, Feb. 16, 2019 (Feb. 16, 2019) (Year: 2019).*

(Continued)

Primary Examiner — Nathan S Taylor
(74) Attorney, Agent, or Firm — COZEN O'CONNOR (57) ABSTRACT A random access method and device may be used in a wireless communications network. The random access method includes selecting a preamble of a message A; determining a logical resource unit for transmitting the message A based on the preamble of the message A, in which the preamble has a predetermined mapping relationship with the logical resource unit, and the logical resource unit includes at least one physical resource unit part, the physical resource unit part is a partial physical resource obtained by dividing a physical uplink shared channel (PUSCH) physical resource; and transmitting the message A through the physical resource unit part included in the logical resource unit.

18 Claims, 10 Drawing Sheets (56) References Cited

U.S. PATENT DOCUMENTS

| | | | |
|---|---|---|---|
| 2020/0404593 A1* | 12/2020 | Yao | H04W 52/54 |
| 2022/0070941 A1* | 3/2022 | Farag | H04W 74/006 |
| 2022/0150956 A1* | 5/2022 | Xiong | H04L 5/0094 |
| 2022/0231806 A1* | 7/2022 | Hu | H04J 13/16 |
| 2022/0232642 A1* | 7/2022 | Ko | H04L 5/0053 |
| 2022/0240326 A1* | 7/2022 | Rune | H04W 74/0866 |
| 2022/0264653 A1* | 8/2022 | Xiong | H04L 1/0023 |
| 2022/0312501 A1* | 9/2022 | Lei | H04W 74/0866 |

OTHER PUBLICATIONS

Itri et al: "Discussion on channel Structure for 2-Step RACH", 3GPP Draft; R1-1905043, Apr. 7, 2019 (Apr. 7, 2019) (Year: 2019).*
Huawei et al: "Discussion on the MsgA resource configuration", 3GPP Draft; R2-1910670, Aug. 16, 2019 (Aug. 16, 2019) (Year: 2019).*
PCT/CN2019/105798 International Search Report, dated May 27, 2020 2 pages.
European Patent Application No. 19945092.5, extended Search and Opinion dated Apr. 20, 2023, 10 pages.
CATT "Discussion on Channel Structure for 2-Step RACH" 3GPP TSG RAN WG1, Meeting #96, R1-1902027, Feb. 2019, 5 pages.
Huawei, et al. "Discussion on the MsgA resource configuration"; 3GPP TSG-RAN WG2 #107, R2-1910670, Aug. 2019, 6 pages.
Itri, et al. "Discussion on channel structure for 2-Step RACH" 3GPP TSG RAN WG1 Meeting #96-BIS, R1-1905043, Apr. 2019, 4 pages.

* cited by examiner

RANDOM ACCESS METHOD AND APPARATUS

CROSS-REFERENCE TO RELATED APPLICATION

This application is a U.S. National Stage of International Application No. PCT/CN2019/105798, filed on Sep. 12, 2019, the contents of all of which are incorporated herein by reference in their entireties for all purposes.

TECHNICAL FIELD

The disclosure relates to a field of mobile network communication technologies, and particularly to a method and apparatus of using a random access channel.

BACKGROUND

A new random access mechanism is introduced in the random access channel (RACH) technology, to reduce an access delay. In the new random access mechanism, a message A (Msg. A) is transmitted in the first step, a message B (Msg. B) is transmitted in the second step, which is referred to as a two-step access (2-step RACH).

SUMMARY

According to a first aspect of the embodiments of the disclosure, a random access method is provided. The method is performed by a terminal and includes: selecting a preamble of a message A; determining a logical resource unit for transmitting the message A based on the preamble of the message A, in which the preamble has a predetermined mapping relationship with the logical resource unit, and the logical resource unit includes at least one physical resource unit part, the physical resource unit part is a partial physical resource obtained by dividing a physical uplink shared channel (PUSCH) physical resource; and transmitting the message A through the physical resource unit part included in the logical resource unit.

According to a second aspect of the embodiments of the disclosure, a random access method is provided. The method is performed by a network device and includes: detecting a preamble of a message A; determining a logical resource unit for transmitting the message A based on the preamble of the message A, in which the preamble has a predetermined mapping relationship with the logical resource unit, and the logical resource unit includes at least one physical resource unit part, the physical resource unit part is a partial physical resource obtained by dividing a physical uplink shared channel (PUSCH) physical resource; and detecting the message A in the physical resource unit part included in the logical resource unit.

According to a third aspect of the embodiments of the disclosure, a random access device is provided. The device includes: a processor and a memory storing instructions executable by the processor. The processor is configured to perform the random access method according to the first aspect of the disclosure.

According to a fourth aspect of the embodiments of the disclosure, a random access device is provided. The device includes: a processor and a memory storing instructions executable by the processor. The processor is configured to perform the random access method according to the second aspect of the disclosure.

It is to be understood that both the foregoing general description and the following detailed description are exemplary and explanatory only, and are not restrictive of the disclosure, as claimed.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

DETAILED DESCRIPTION

Representative embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

In the related art, when a terminal performs a random access using the 2-step RACH mechanism and the Msg. A is transmitted, the terminal selects a same preamble mapped to a same physical uplink shared channel (PUSCH) resource, or selects different preambles mapped to the same PUSCH resource, which may cause a transmission failure.

In order to solve the transmission failure problem in the related art, a random access method and apparatus is disclosed herein.

Figure 1:
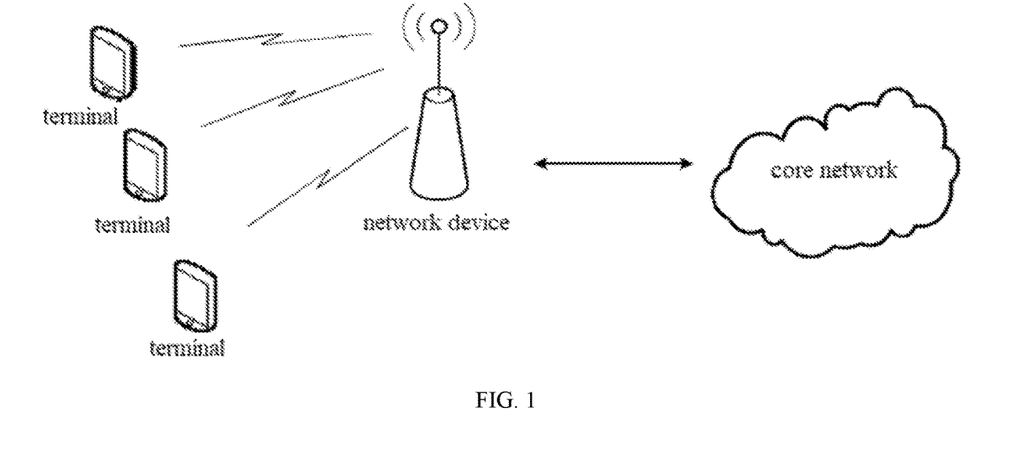
FIG. 1 is a schematic diagram illustrating a wireless communication system according to an embodiment.

The disclosure provides a random access method. The method may be applied in a wireless communication system illustrated in FIG. 1. As illustrated in FIG. 1, a terminal is accessed to a network through a network device such as a base station. The network device and a core network complete forward and reverse transmissions of data, to provide various communication services.

It is understandable that the wireless communication system is a network that provides a wireless communication function. The wireless communication system can use different communication technologies, such as code division multiple access (CDMA), wideband code division multiple access (WCDMA), and time division multiple access (TDMA), frequency division multiple access (FDMA), orthogonal frequency-division multiple access (OFDMA), single carrier frequency division multiple access (SC-FDMA), carrier sense multiple access with collision avoidance. According to different network capacities, speeds, delays and other factors, the network can be divided into the 2G (generation) network, the 3G network, the 4G network or a future evolution network, such as the 5G network. The 5G network can also be called a new wireless network (New Radio, NR). For convenience of description, the disclosure sometimes refers to the wireless communication network as a network or a system. The network in the disclosure may include a radio access network (RAN) and a core network (CN). The network includes a network device, and the network device may be, for example, a wireless access network node, a core network device, and the like. The wireless access network node may also be called a base station. The network can provide network services for the terminal through the network device, and different operators can provide different network services for the terminal. It can also be understood that different operators correspond to different operator networks.

The terminal, which can also be referred to as user equipment (UE), mobile station (MS), mobile terminal (MT), etc., is a device that provides users with voice and/or data connectivity. For example, the terminal may be a handheld device with a wireless connection function, a vehicle-mounted device, or the like. At present, some examples of the terminal may be: smart phones (mobile phones), pocket personal computers (PPCs), handheld computers, personal digital assistants (PDAs), notebook computers, tablet computers, wearable devices, or vehicle-mounted devices, etc.

Figure 2:
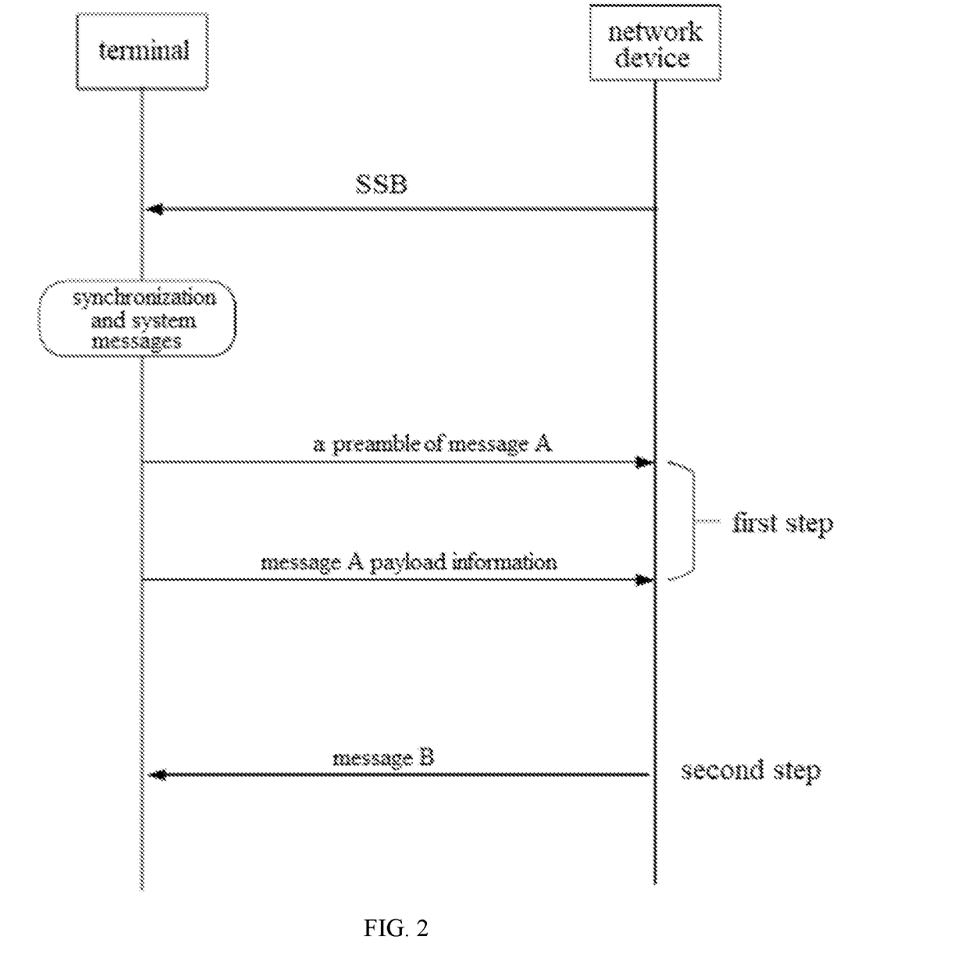
FIG. 2 is a flowchart illustrating a random access method according to an embodiment.

When the terminal prepares to access the network, a random access needs to be performed. In the related art, a 2-step RACH mechanism is introduced to perform the random access. FIG. 2 is a flowchart illustrating a 2-step RACH random access method according to an embodiment. Referring to FIG. 2, when performing the random access, the terminal may obtains a synchronization signal and PBCH block (SSB) to obtain synchronization and system messages, and then sends a preamble in a physical random access channel (PRACH) corresponding to the obtained SSB. In the 2-step RACH, in the first step (step 1), a message A (Msg. A) is transmitted, i.e., the terminal selects the suitable preamble to be sent on the PRACH resource, at the same time, the network device detects the preamble on the corresponding PRACH. The terminal transmits payload information on a corresponding PUSCH resource. The payload information includes equivalent information of the Msg. 3 in the legacy four step random access, for example an identity (ID), and the payload information may further include a part of user data. When the network device detects the preamble, the network device may receive data on the corresponding PUSCH. In the second step (step 2), a message B (Msg. B) is transmitted, i.e., when the network device successfully receives the preamble or successfully receives the preamble and data, the Msg. B is sent to the terminal. The Msg. B includes equivalent information of the Msg. 2 and Msg. 4 in the legacy four step random access, for example time synchronization information in the Msg. 2, conflict resolution information in the Msg. 4, or the like. The Msg. B is transmitted through a physical downlink control channel (PDCCH) together with a physical downlink shared channel (PDSCH), similar to the legacy four step random access. The PDSCH may include information of multiple users. The terminal receives the Msg. B on the corresponding physical resource, and extracts the information for the terminal.

In the related art, during transmission of the Msg. A, the preamble has a mapping relationship with the PUSCH physical resource. The mapping relationship may be a many-to-one mapping relationship, or may be a one-to-many mapping relationship. In other words, if the terminal selects the preamble, the terminal determines the PUSCH physical resource for transmitting the Msg. A based on the selected preamble. However, since the 2-step RACH is contention based random access, when the preamble has the one-to-one mapping relationship with the PUSCH physical resource, multiple terminals may select the same preamble, and may also use the same PUSCH physical resource. When a collision occurs in the multiple terminals using the same PUSCH physical resource, since the multiple terminals select the identical PUSCH physical resource, a strong interference may occur between the multiple terminals, such that several terminals may have transmission failure. When the preamble has the many-to-one mapping relationship with the PUSCH physical resource, even two terminals select different preambles, as long as the two preambles are mapped to the same PUSCH physical resource, a PUSCH resource collision may occur, thus causing a transmission failure.

Accordingly, the disclosure provides a random access method. In the random access method, when the physical resource is configured, the PUSCH physical resource is divided and the divided PUSCH partial physical resources are reorganized. A mapping relationship is established between the reorganized new physical resource and the preamble. When performing the random access, the reorganized new physical resource is used to transmit the Msg. A, to reduce a possibility that different terminals are mapped to the same PUSCH physical resource during the random access process, thus reducing a collision probability and a probability of transmission failure.

A process of configuring the physical resource in the random access method will be described below.

The following terms are defined in the disclosure. The PUSCH physical resource is defined as a physical resource unit (PRU). The PRU includes time, frequency domain and reference signals or the like. A partial physical resource obtained by dividing the PRU can be referred to as a PRU part. A new physical resource obtained by reorganizing the PRU parts is referred to as a logical resource unit (LRU).

Figure 3A:
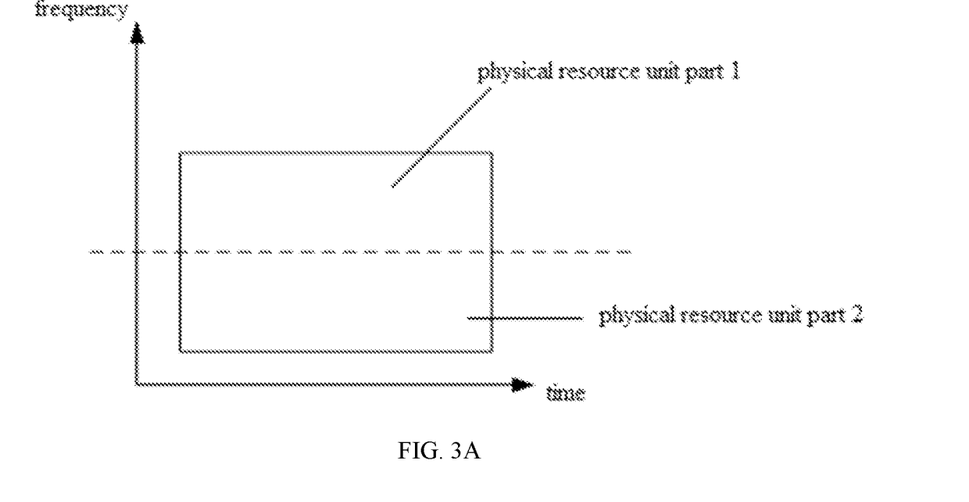
FIG. 3A-FIG. 3C are schematic diagrams illustrating a division of a physical resource unit (PRU) according to an embodiment.
Figure 3B:
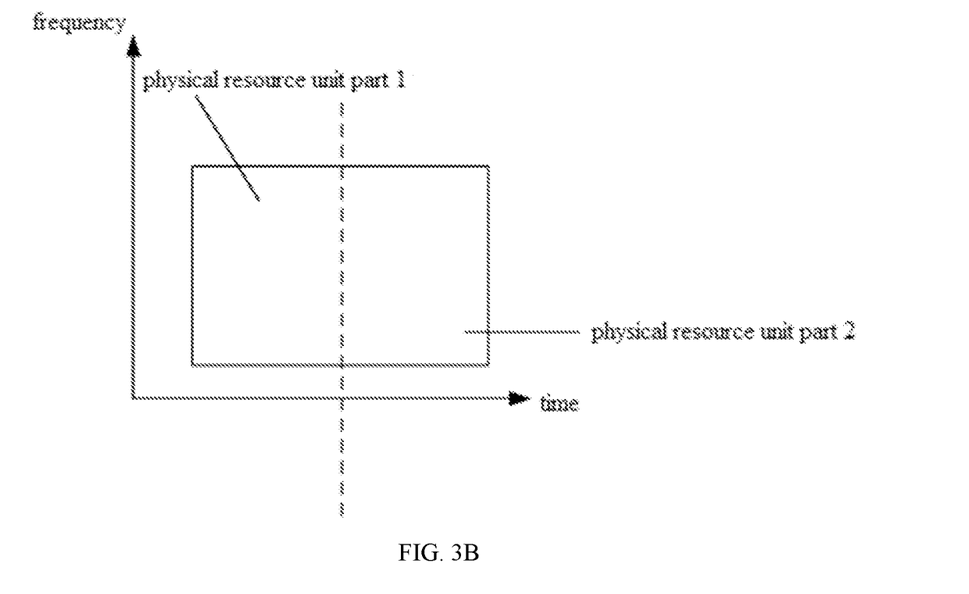
Figure 3C:
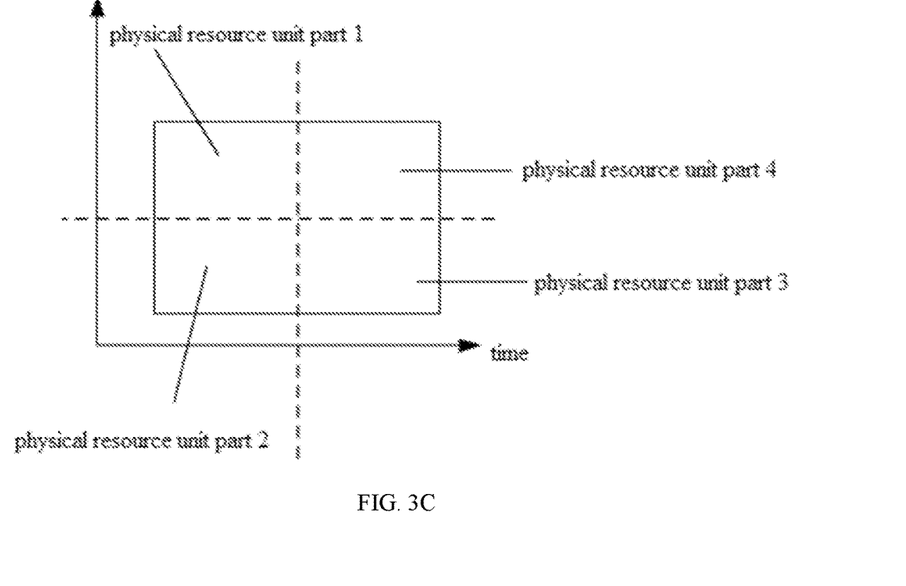

In the disclosure, the PRU can be divided using a time division mode, or using a frequency division mode, or the PUSCH physical resource can be divided using a time-frequency division mode to obtain the PRU part. FIG. 3A-FIG. 3C are schematic diagrams illustrating a division of the PRU. In FIG. 3A, the PRU is divided into two parts including PRU part 1 and PRU part 2 using the frequency division mode in the frequency domain. In FIG. 3B, the PRU is divided into two parts including PRU part 1 and PRU part 2 using the time division mode in the time domain. In FIG. 3C, the PRU is divided into four parts including PRU part 1, PRU part 2, PRU part 3 and PRU 4 using the time-frequency division mode in the time domain.

Further, in the disclosure, after dividing the PRU to obtain the PRU part, the obtained PRU parts obtained by dividing respective PRUs can be reorganized to obtain the LRU. Each LRU includes one or more PRU parts. The PRU parts included in the same LRU may be from the same PRU or different PRUs.

Further, different LRUs may include the same PRU part, or may include different PRU parts. In other words, the reorganized LRU may overlap in the physical resources, or may not overlap in the physical resources.

Figure 4:
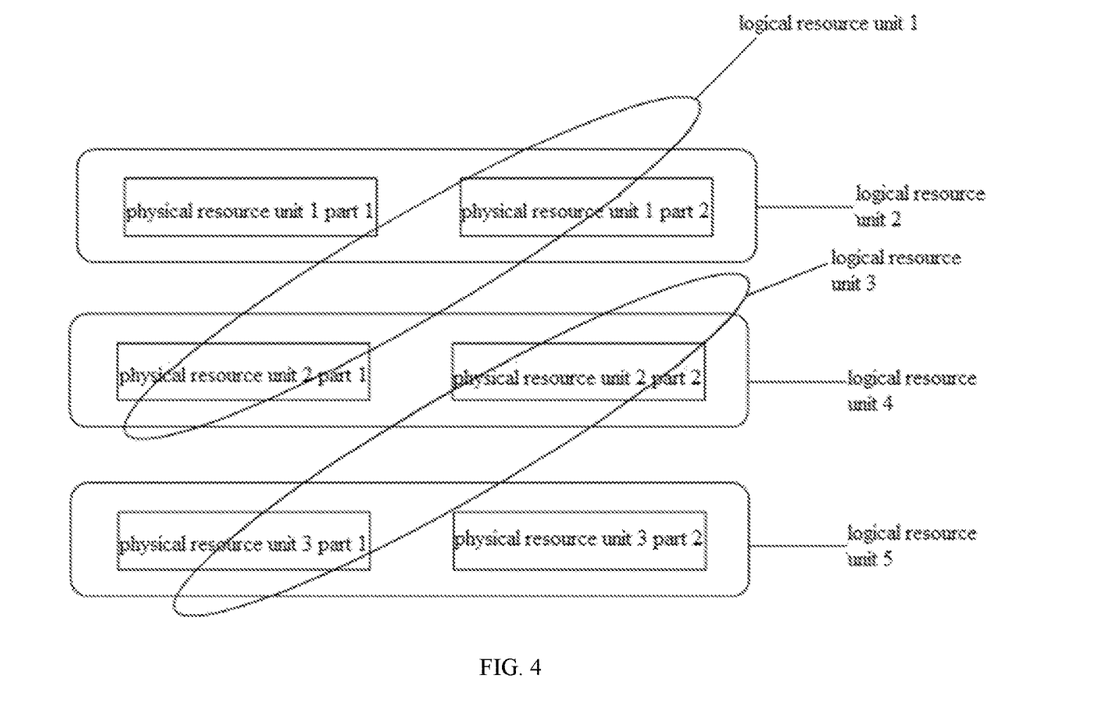
FIG. 4 is a schematic diagram illustrating a reorganized logical resource unit (LRU) according to an embodiment.

FIG. 4 is a schematic diagram illustrating to the LRU according to an embodiment. As illustrated in FIG. 4, PRU 1 is divided to obtain PRU 1 part 1 and PRU 1 part 2. PRU 2 is divided to obtain PRU 2 part 1 and PRU 2 part 2. PRU 3 is divided to obtain PRU 3 part 1 and PRU 3 part 2. The PRU 1 part 2 and the PRU 2 part 1 are reorganized to obtain LRU 1. The PRU 1 part 1 and the PRU 1 part 2 are reorganized to obtain LRU 2. The PRU 3 part 1 and the PRU 2 part 2 are reorganized to obtain LRU 3. The PRU 2 part 2 and the PRU 2 part 1 are reorganized to obtain LRU 4. The PRU 3 part 1 and the PRU 3 part 2 are reorganized to obtain LRU 5. As illustrated in FIG. 4, the PRU parts in the LRU 1 and the LRU 3 may be from different PRUs. The PRU parts in the LRU 2, the LRU 4 and the LRU 5 are from the same PRU. The LRU 2 and the LRU 5 include different PRU parts. The LRU 2 and the LRU 5 have no overlapped physical resource. The LRU 1 and the LRU 2 include the same PRU 1 part 2, that is, the LRU 1 and the LRU 2 have some overlapped physical resources.

Figure 5A:
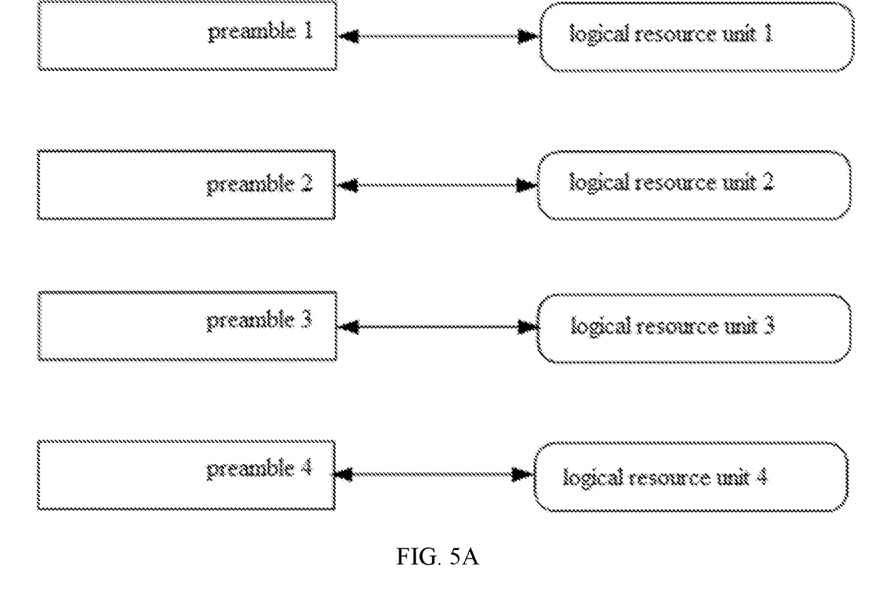
FIG. 5A-FIG. 5B are schematic diagrams illustrating a mapping relationship between LRUs and preambles according to an embodiment.
Figure 5B:
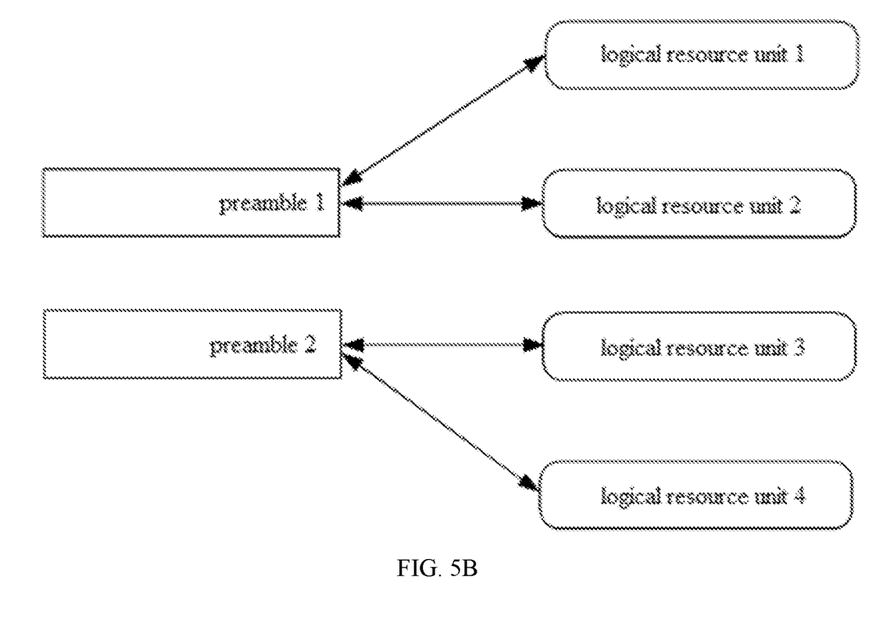

Further, the mapping relationship between the preambles and the LRUs may be set in advance in the disclosure, such that the LRU for transmitting the message A may be determined according to the preamble in the subsequent random access. In the disclosure, on one hand, the one-to-one mapping relationship between the preambles and the LRUs is set in advance, as illustrated in FIG. 5A. On the other hand, the one-to-many mapping relationship between the preambles and the LRUs is set in advance, as illustrated in FIG. 5B. In the disclosure, after the mapping relationship between the preambles and the LRUs is set in advance, the preset mapping relationship between the preambles and the LRUs is written in a protocol in a predetermined way, so that the terminal or the network device may determine the LRU for transmitting the message A based on the preset mapping relationship between the preambles and the LRUs when performing the random access.

The random access process using the above resource configuration mode will be described below.

Figure 6:
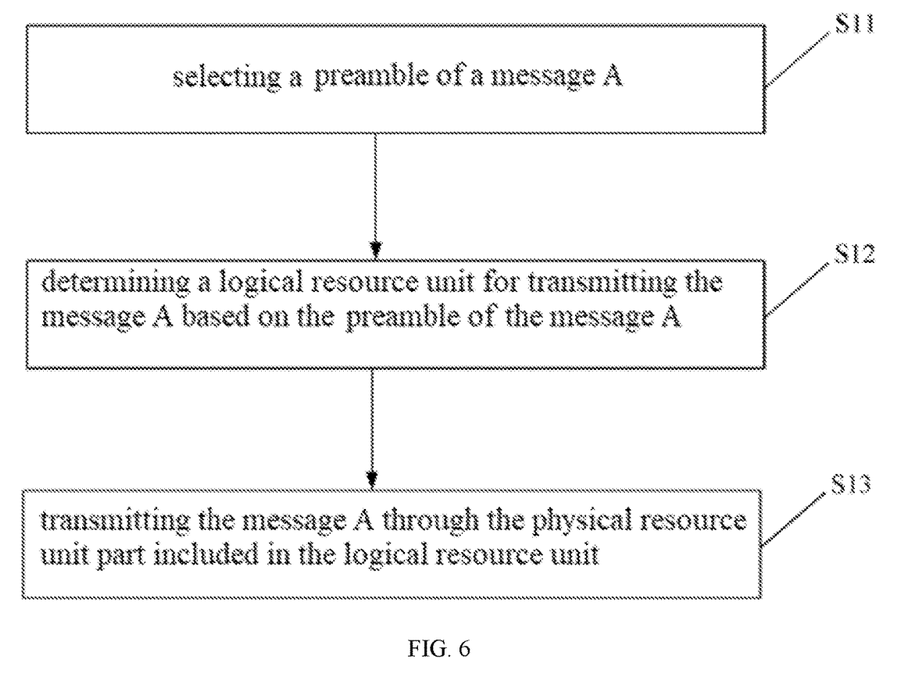
FIG. 6 is a flowchart illustrating a random access method according to an embodiment.

FIG. 6 is a flowchart illustrating a random access method according to an embodiment. As illustrated in FIG. 6, the random access method is applied in the terminal, and includes the following steps S11-S13.

At block S11, a preamble of a message A is selected.

Figure 7A:
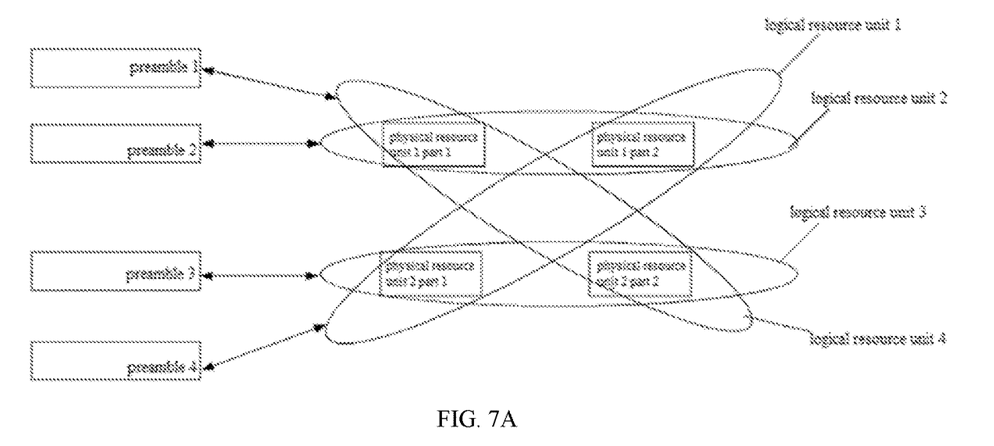
FIG. 7A-FIG. 7B are schematic diagrams illustrating a mapping relationship between LRUs and preambles according to an embodiment.
Figure 7B:
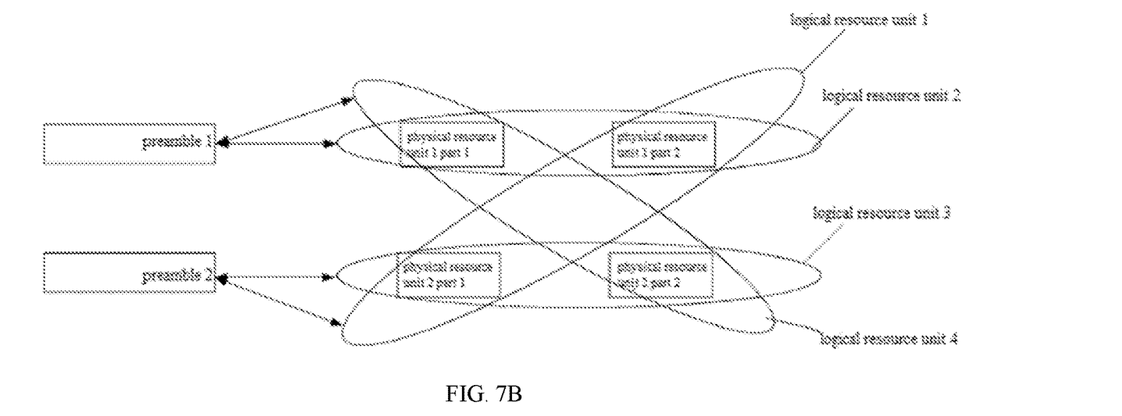

In the disclosure, there is a preset mapping relationship between preambles and LRUs. On one hand, there is a preset one-to-one mapping relationship between the preambles and the LRUs, as illustrated in FIG. 7A. On the other hand, there is a preset one-to-many mapping relationship between the preambles and the LRUs, as illustrated in FIG. 7B.

In the disclosure, when the terminal performs the random access, a suitable preamble is selected to be sent on the PRACH resource.

At block S12, the LRU for transmitting the Msg. A is determined based on the preamble of the Msg. A.

In the disclosure, after selecting the preamble, the terminal may determine the LRU corresponding to the selected preamble based on the preset mapping relationship between the selected preamble and the LRU, and further may determine the LRU for transmitting the Msg. A.

In an embodiment, when the terminal determines the LRU for transmitting the Msg. A in the disclosure, if there is the one-to-one mapping relationship between the preambles and the LRUs, the LRU corresponding to the selected preamble is directly determined as the LRU for transmitting the Msg. A. If there is the one-to-many mapping relationship between the preambles and the LRUs, an LRU is selected from the multiple LRUs corresponding to the selected preamble as the LRU for transmitting the Msg. A.

When the LRU is selected from the multiple LRUs corresponding to the selected preamble as the LRU for transmitting the Msg. A, on one hand, the LRU is randomly selected from the multiple LRUs corresponding to the selected preamble as the LRU for transmitting the Msg. A; on the other hand, the LRU matching a preset rule is selected from the multiple LRUs corresponding to the selected preamble based on the preset rule as the LRU for transmitting the Msg. A.

In the disclosure, the preset rule for selecting the LRU may be a preset matching rule between channel conditions and the LRUs, and/or a preset matching rule between modulation and coding schemes (MCSs) and the LRUs. For example, the preset rule for selecting the LRU is the preset matching rule between the MCSs and the LRUs. As illustrated in FIG. 7B, when the selected preamble is preamble 1, the preset matching rule between the MCSs and the LRUs is: MCS x matching LRU 1, and MCS y matching LRU 2. In case that the LRU matching the preset rule is selected from the multiple LRUs corresponding to the selected preamble based on the preset rule as the LRU for transmitting the Msg. A, if the preamble selected by the terminal is the preamble 1, when the MCS x is used, the LRU 1 is determined as the LRU for transmitting the Msg. A, and when the MCS y is used, the LRU 2 is determined as the LRU for transmitting the Msg. A.

The LRU matching the preset rule is selected from the multiple LRUs corresponding to the preamble based on the preset rule as the LRU for transmitting the Msg. A.

At block S13, the Msg. A is transmitted through the PRU part included in the determined LRU.

In the disclosure, after the terminal determines the LRU corresponding to the selected preamble, the Msg. A payload information is transmitted through the PRU part included in the determined LRU. For example, as illustrated in FIG. 7A, the preamble selected by the terminal is the preamble 1, and the LRU 4 is determined as the LRU for transmitting the Msg. A. When transmitting the Msg. A, the PRU 1 part 1 and the PRU 2 part 2 included in the LRU 4 is used to transmitted the Msg. A payload information.

In the disclosure, by transmitting the Msg. A through the PRU part included in the LRU, a possibility that different terminals are mapped to the same PUSCH physical resource during the random access process can be reduced, thus reducing a collision probability and a probability of transmission failure.

Figure 8:
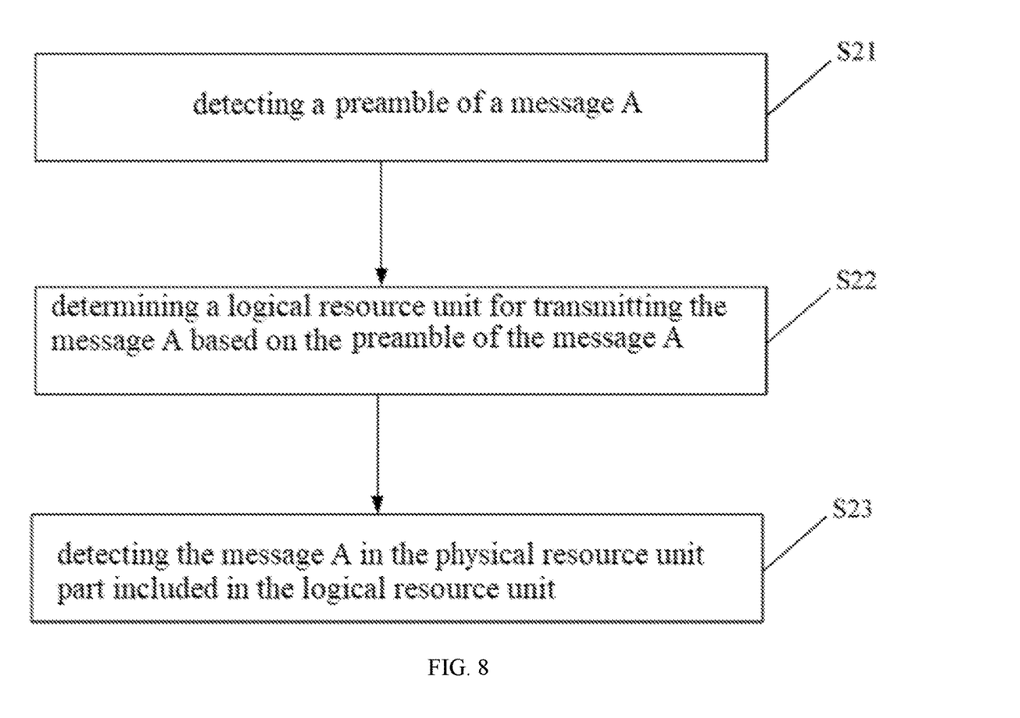
FIG. 8 is a flowchart illustrating a random access method according to an embodiment.

FIG. 8 is a flowchart illustrating a random access method according to an embodiment. As illustrated in FIG. 8, the random access method is applied in a network device and includes the following steps S21-S23.

At block S21, a preamble of a Msg. A is detected.

In the disclosure, the network device detects the preamble on a PARCH resource corresponding to the preamble sent by the terminal.

At block S22, an LRU for transmitting the Msg. A is determined based on the preamble of the Msg. A.

In the disclosure, there is a predetermined mapping relationship between preambles and LRUs. On one hand, there is a predetermined one-to-one mapping relationship between the preambles and the LRUs, on the other hand, there is a predetermined one-to-many mapping relationship between the preambles and the LRUs.

In the disclosure, after the terminal selects the preamble, the LRU corresponding to the selected preamble may be determined based on the preset mapping relationship between the selected preamble and the LRU, and further the LRU for transmitting the Msg. A can be determined.

In an embodiment, when the terminal determines the LRU for transmitting the Msg. A in the disclosure, if there is the preset one-to-one mapping relationship between the preambles and the LRUs, the LRU corresponding to the selected preamble is directly determined as the LRU for transmitting the Msg. A. If there is the preset one-to-many mapping relationship between the preambles and the LRUs, an LRU is selected from multiple LRUs corresponding to the selected preamble as the LRU for transmitting the Msg. A.

When the LRU is selected from the multiple LRUs corresponding to the selected preamble as the LRU for transmitting the Msg. A, on one hand, the LRU is randomly selected from the multiple LRUs corresponding to the selected preamble as the LRU for transmitting the Msg. A; on the other hand, the LRU matching a preset rule is selected from the multiple LRUs corresponding to the selected preamble based on the preset rule as the LRU for transmitting the Msg. A.

In the disclosure, the preset rule for selecting the LRU may be a preset matching rule between channel conditions and the LRUs, and/or a preset matching rule between modulation and coding schemes (MCSs) and the LRUs.

At block S23, the Msg. A is detected in the PRU part included in the determined LRU.

In the disclosure, after the network device determines the LRU, the Msg. A payload information is detected in the PRU part included in the LRU and received.

In the disclosure, after the network device detects the preamble selected by the terminal, the LRU corresponding to the selected preamble may be determined based on the preset mapping relationship between the selected preamble and the LRU, and further the LRU for transmitting the Msg. A is determined. The Msg. A information is detected in the PRU part included in the LRU and received, thus avoiding a cotillion.

Figure 9:
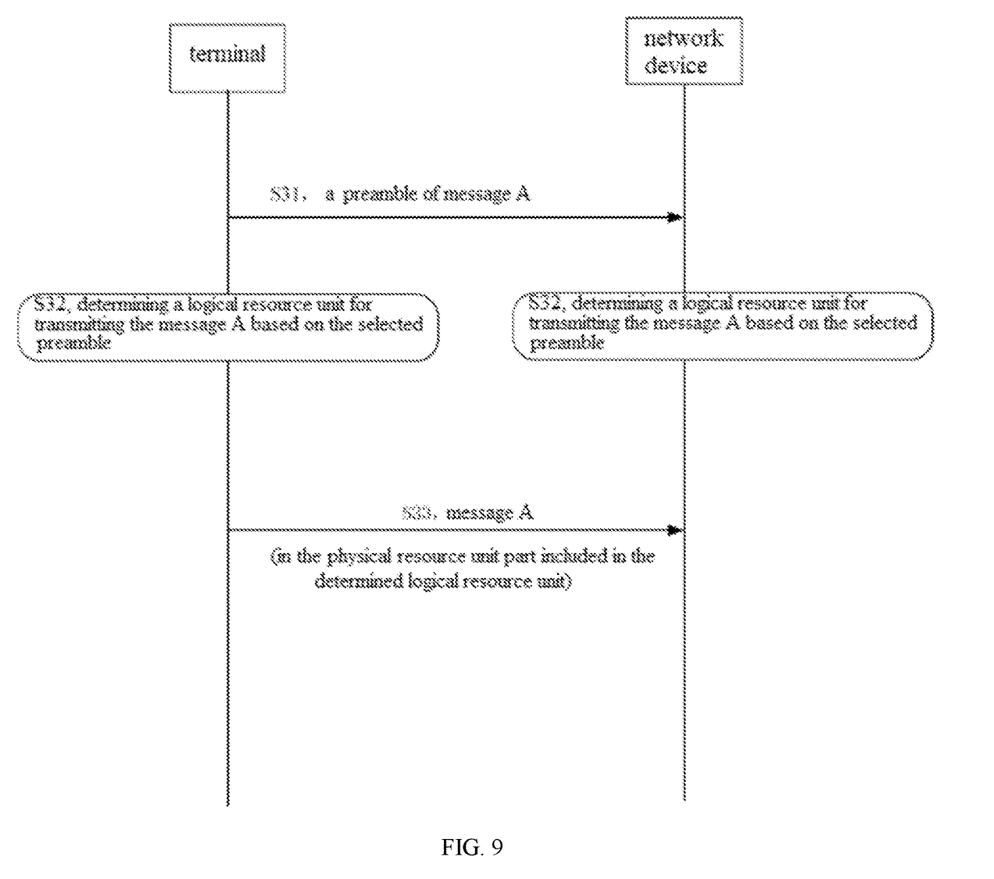
FIG. 9 is a flowchart illustrating a random access method according to an embodiment.

FIG. 9 is a flowchart illustrating a random access method according to an embodiment. As illustrated in FIG. 9, the random access method is applied in an interaction between a network device and a terminal, and the random access method includes the following steps S31-S33.

At block S31, the terminal selects a suitable preamble to be sent on a PRACH resource, and at the same time, the network device detects the preamble on the corresponding PRACH.

At block S32, the terminal determines the LRU for transmitting the Msg. A based on the selected preamble. The network device determines the LRU for transmitting the Msg. A based on the detected preamble.

At block S33, the terminal transmits the Msg. A payload information through the PRU part included in the LRU. The network device detects and receives the Msg. A payload information from the PRU part included in the determined LRU.

The payload information includes equivalent information of the Msg. 3 in the legacy four-step random access, for example the identity, and may further include a part of user data.

The implementation of the random access method in the interaction between the network device and the terminal provided in the disclosure is similar to the implementation of the random access method performed by the terminal or the network according to the embodiment of the disclosure. For details of the implementation of the random access method not described with reference to FIG. 9, reference can be made to the description of the above embodiments.

In the random access method according to the disclosure, the preamble has the predetermined mapping relationship with the LRU, and the LRU includes the PRU part obtained by dividing the PUSCH physical resource. By transmitting the Msg. A through the PRU part included in the LRU, a possibility that different terminals are mapped to the same PUSCH physical resource during the random access process can be reduced, thus reducing a collision probability and a probability of transmission failure.

Based on the same conception, the embodiment of the disclosure further provides a random access apparatus.

It is understood that, the random access apparatus provided in the embodiment of the disclosure includes corresponding hardware and/or software modules for performing various functions to implement the above functionality. In combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 10:
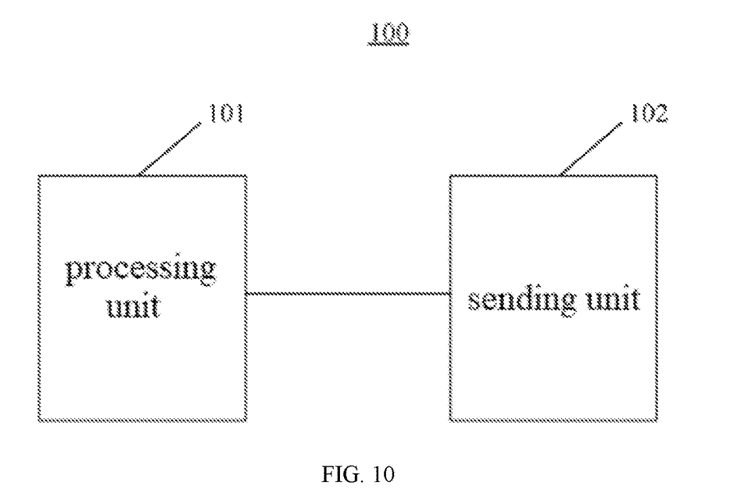
FIG. 10 is a block diagram illustrating a random access apparatus according to an embodiment.

FIG. 10 is a block diagram illustrating a random access apparatus 100 according to an embodiment. As illustrated in FIG. 10, the random access apparatus 100 is applied in a terminal, and the random access apparatus 100 includes a processing unit 101 and a sending unit 102.

The processing unit 101 is configured to select a preamble of a Msg. A and determine an LRU for transmitting the Msg. A based on the preamble of the Msg. A. The sending unit 102 is configured to transmit the Msg. A through a PRU part included in the LRU.

The preamble has a predetermined mapping relationship with the LRU, and the LRU includes at least one PRU part, the PRU part is a partial physical resource obtained by dividing a physical uplink shared channel (PUSCH) physical resource.

In an implementation, PRU parts included in the same LRU are from the same PUSCH physical resource or different PUSCH physical resources.

In another implementation, different LRUs include the same PRU part or different PRU parts.

In another implementation, the PRU part is the partial physical resource obtained by dividing the PUSCH physical resource using a time division mode and/or a frequency division mode.

In another implementation, the preamble has a predetermined one-to-one mapping relationship with the LRU, or the preamble has a predetermined one-to-many mapping relationship with the LRU.

In another implementation, the preamble has a predetermined one-to-many mapping relationship with the LRU.

The processing unit 101 is configured to randomly select the LRU for transmitting the Msg. A from a plurality of LRUs corresponding to the preamble; or select an LRU matching a preset rule from a plurality of LRUs corresponding to the preamble based on the preset rule as the LRU for transmitting the Msg. A.

In another implementation, the preset rule includes a preset matching rule between channel conditions and LRUs, and/or a preset matching rule between modulation and coding schemes (MCSs) and LRUs.

Figure 11:
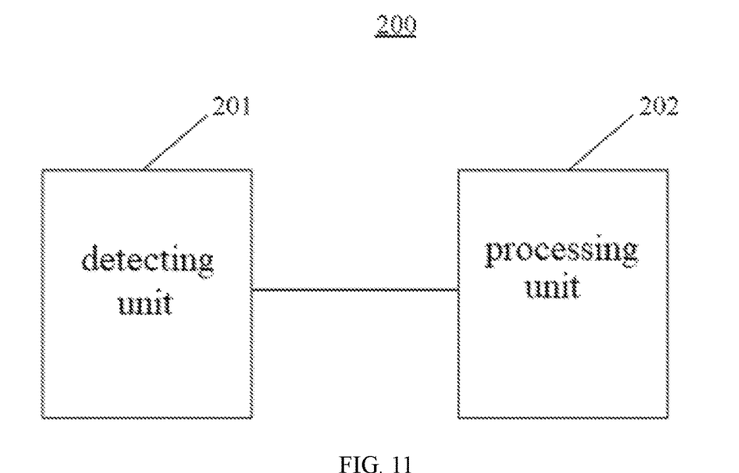
FIG. 11 is a block diagram illustrating a random access apparatus according to an embodiment.

FIG. 11 is a block diagram illustrating a random access apparatus 200 according to an embodiment. As illustrated in FIG. 11, the random access apparatus 200 is applied in a network device, and the random access apparatus 200 includes a detecting unit 201 and a processing unit 202.

The detecting unit 201 is configured to detect a preamble of a Msg. A and detect the Msg. A in a PRU part included in an LRU. The processing unit 202 is configured to determine the LRU for transmitting the Msg. A based on the preamble of the Msg. A.

The preamble has a predetermined mapping relationship with the LRU, and the LRU includes at least one PRU part, the PRU part is a partial physical resource obtained by dividing a physical uplink shared channel (PUSCH) physical resource.

In an implementation, PRU parts included in the same LRU are from the same PUSCH physical resource or different PUSCH physical resources.

In another implementation, different LRUs include the same PRU part or different PRU parts.

In another implementation, the PRU part is the partial physical resource obtained by dividing the PUSCH physical resource using a time division mode and/or a frequency division mode.

In another implementation, the preamble has a predetermined one-to-one mapping relationship with the LRU, or the preamble has a predetermined one-to-many mapping relationship with the LRU.

In another implementation, the preamble has a predetermined one-to-many mapping relationship with the LRU.

The processing unit 201 is configured to determine the LRU for transmitting the Msg. A based on the preamble of the Msg. A by randomly selecting the LRU for transmitting the Msg. A from a plurality of LRUs corresponding to the preamble or selecting an LRU matching a preset rule from a plurality of LRUs corresponding to the preamble based on the preset rule as the LRU for transmitting the Msg. A.

In another implementation, the preset rule includes a preset matching rule between channel conditions and LRUs, and/or a preset matching rule between modulation and coding schemes (MCSs) and LRUs.

Regarding the apparatus in the above-mentioned embodiments, the specific manner in which each module performs operations has been described in detail in the method embodiments, and will not be described in detail here.

Figure 12:
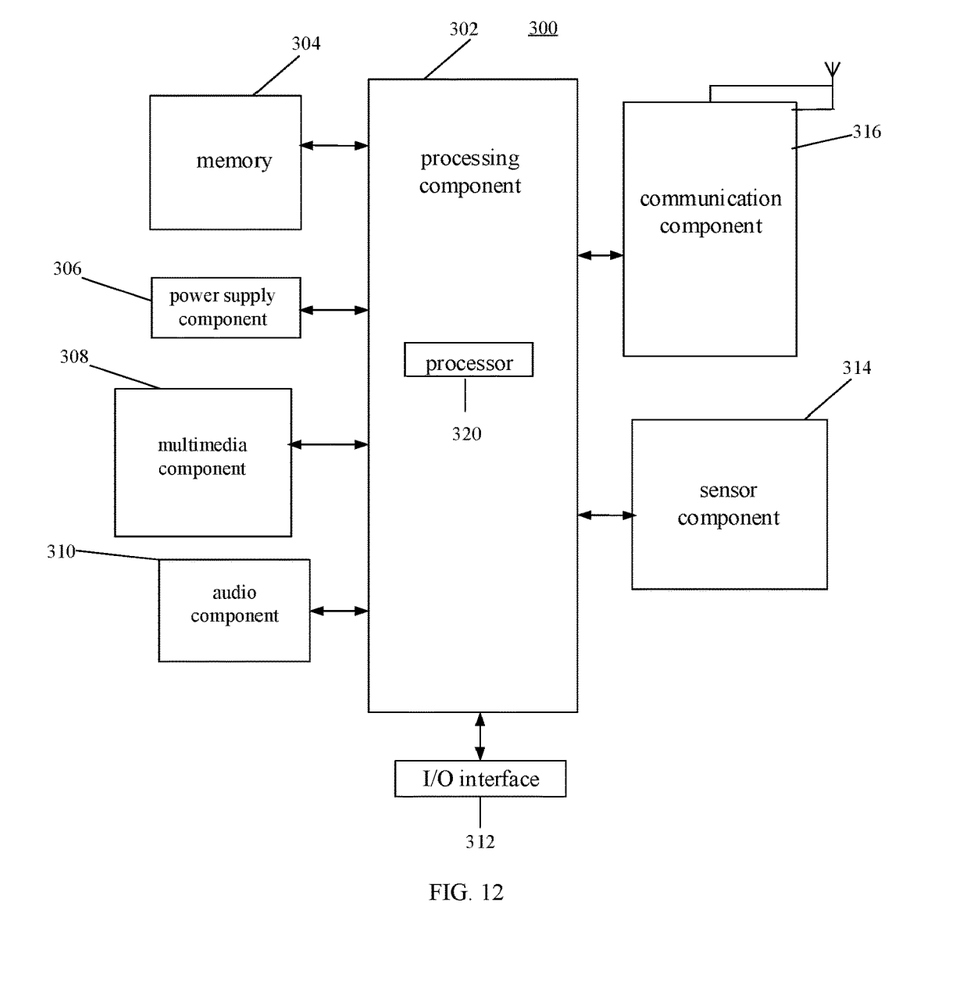
FIG. 12 is a block diagram illustrating a device according to an embodiment.

FIG. 12 is a block diagram illustrating an apparatus 300 suitable for random access according to an embodiment. For example, the apparatus 300 may be a mobile phone, a computer, a digital broadcasting terminal, a messaging device, a game console, a tablet device, a medical equipment, a fitness equipment, a personal digital assistant, and so on.

Referring to FIG. 12, the apparatus 300 may include one or more components of the followings: a processing component 302, a memory 304, a power supply component 306, a multimedia component 308, an audio component 310, an input/output (I/O) interface 312, a sensor component 314, and a communication component 316.

The processing component 302 generally controls the whole operation of the apparatus 300, such as the operations related to display, phone call, data communication, camera operation and recording operation. The processing component 302 may include one or more processors 320 to perform instructions, to complete all or part of blocks of the above method. In addition, the processing component 302 may include one or more modules for the convenience of interaction between the processing component 302 and other components. For example, the processing component 302 may include a multimedia module for the convenience of interaction between the multimedia component 308 and the processing component 302.

The memory 304 is configured to store all types of data to support the operation of the apparatus 300. Examples of the data include the instructions of any applications or methods operated on the apparatus 300, contact data, phone book data, messages, pictures, videos, etc. The memory 304 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 306 may provide power for all components of the apparatus 300. The power supply component 306 may include a power supply management system, one or more power supplies, and other units related to generating, managing and distributing power for the apparatus 300.

The multimedia component 308 includes an output interface screen provided between the apparatus 300 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 308 includes a front camera and/or a rear camera. When the apparatus 300 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 310 is configured to output and/or input an audio signal. For example, the audio component 310 includes a microphone (MIC). When the apparatus 300 is in an operation mode, such as a call mode, a record mode, and a speech recognition mode, the microphone is configured to receive the external audio signal. The received audio signal may be further stored in the memory 304 or sent via the communication component 316. In some embodiments, the audio component 310 further includes a speaker configured to output an audio signal.

The I/O interface 312 provides an interface for the processing component 302 and the peripheral interface module, and the peripheral interface module may be a keyboard, a click wheel, a button, etc. The button may include but not limited to a home button, a volume button, a start button and a lock button.

The sensor component 314 includes one or more sensors, configured to provide various aspects of status assessment for the apparatus 300. For example, the sensor component 314 may detect the on/off state of the apparatus 300 and the relative positioning of the component. For example, the component is a display and a keypad of the apparatus 300. The sensor component 314 may further detect the location change of the apparatus 300 or one component of the apparatus 300, the presence or absence of contact between the user and the apparatus 300, the orientation or acceleration/deceleration of the apparatus 300, and the temperature change of the apparatus 300. The sensor component 314 may include a proximity sensor configured to detect the existence of the objects nearby without any physical contact. The sensor component 314 may further include a light sensor such as CMOS or CCD image sensor, which is configured to use in imaging applications. In some embodiments, the sensor component 314 may further include an acceleration transducer, a gyroscope sensor, a magnetic sensor, a pressure sensor or a temperature sensor.

The communication component 316 is configured for the convenience of wire or wireless communication between the apparatus 300 and other devices. The apparatus 300 may access wireless networks based on communication standard, such as WiFi, 2G or 3G, or their combination. In an embodiment, the communication component 316 receives broadcast signals or broadcast-related information from an external broadcast management system via a broadcast channel. In an embodiment, the communication component 316 further includes a near field communication (NFC) module to facilitate short-range communication. For example, the NFC module may be achieved based on an RFID technology, an IrDA technology, a UWB technology, a BT technology and other technologies.

In an embodiment, the apparatus 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes instructions, such as the memory 304 including instructions, the instructions may be executed by the processor 320 of the apparatus 300 to complete the above methods. For example, the non-transitory computer-readable storage medium may be a ROM, a random access memory (RAM), a CD-ROM, a magnetic tape, a floppy disk, an optical data storage device, etc.

Figure 13:
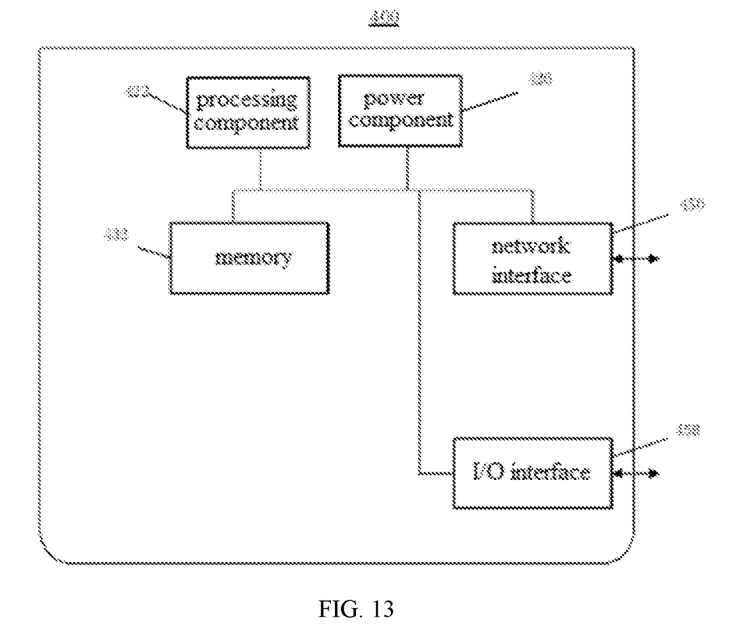
FIG. 13 is a block diagram illustrating a device according to an embodiment.

FIG. 13 is a block diagram illustrating an apparatus 400 suitable for random access according to an embodiment. For example, the apparatus 400 may be provided as a network device. As illustrated in FIG. 13, the apparatus 400 includes a processing component 422, which further includes one or more processors, and a memory resource represented by a memory 432, for storing instructions executable by the processing component 422, such as an application program. The application program stored in the memory 432 may include one or more modules each corresponding to a set of instructions. In addition, the processing component 422 is configured to execute the instructions to perform the above methods.

The apparatus 400 may also include a power component 426 configured to perform power management of the apparatus 400, a wired or wireless network interface 450 configured to connect the apparatus 400 to a network, and an input output (I/O) interface 458. The apparatus 400 can operate based on an operating system stored in the memory 432, such as Windows Server™, Mac OS X™, Unix™, Linux™, FreeBSD™ or the like.

In an embodiment, the apparatus 400 includes a processor; and a memory for storing instructions executable by the processor. The processor is configured to execute the aforementioned random access method.

In an embodiment, there is provided a non-transitory computer-readable storage medium including instructions, such as the memory 432 including instructions, which may be executed by the processing component 422 of the apparatus 400 to complete the foregoing methods. For example, the non-transitory computer-readable storage medium may be ROM, random access memory (RAM), CD-ROM, magnetic tape, floppy disk, optical data storage device, etc.

It is understandable that in the disclosure, terms "network" and "system" are used interchangeably, but those skilled in the art can understand their meanings.

It can be further understood that in the disclosure, the term "a plurality of" refers to two or more than two, and other quantifiers are similar. The term "and/or" describes an association relationship of associated objects, indicating that there can be three types of relationships. For example, A and/or B can indicate: A alone exists, A and B exist at the same time, and B exists alone. The character "/" generally indicates that the associated objects are in an "or" relationship. The singular forms "a", "said" and "the" are also intended to include plural forms, unless specified or limited otherwise.

It can be understood that, although the operations are described in a specific order in the drawings of the embodiments of the disclosure, they should not be understood as requiring these operations to be performed in the specific order shown or in a serial order, or requiring all these operations to be performed to obtain the desired result. In certain circumstances, multitasking and parallel processing may be advantageous.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

The invention claimed is:

1. A random access method, performed by a terminal, comprising:
　selecting a preamble of a message A;
　determining a logical resource unit for transmitting the
　　message A based on the preamble of the message A, wherein the preamble has a predetermined mapping relationship with the logical resource unit, and the logical resource unit is obtained by reorganizing physical resource unit parts, the physical resource unit part is a partial physical resource obtained by dividing a physical uplink shared channel (PUSCH) physical resource; and transmitting the message A through the physical resource unit part included in the logical resource unit;

wherein physical resource unit parts included in the same logical resource unit are from different PUSCH physical resources and different logical resource units comprise partially overlapped physical resource unit parts.

2. The method of claim 1, wherein different logical resource units comprise the same physical resource unit part or different physical resource unit parts.

3. The method of claim 1, wherein the physical resource unit part is the partial physical resource obtained by dividing the PUSCH physical resource using at least one of a time division mode and a frequency division mode.

4. The method of claim 1, wherein the preamble has a predetermined one-to-one mapping relationship with the logical resource unit, or the preamble has a predetermined one-to-many mapping relationship with the logical resource unit.

5. The method of claim 4, wherein the preamble has the predetermined one-to-many mapping relationship with the logical resource unit,
    determining the logical resource unit for transmitting the message A based on the preamble of the message A comprises one of the following:
    randomly selecting the logical resource unit for transmitting the message A from a plurality of logical resource units corresponding to the preamble; and
    selecting a logical resource unit matching a preset rule from a plurality of logical resource units corresponding to the preamble based on the preset rule as the logical resource unit for transmitting the message A.

6. The method of claim 5, wherein the preset rule comprises at least one of a preset matching rule between channel conditions and logical resource units and a preset matching rule between modulation and coding schemes (MCSs) and logical resource units.

7. A random access method, performed by a network device, comprising:
    detecting a preamble of a message A;
    determining a logical resource unit for transmitting the message A based on the preamble of the message A, wherein the preamble has a predetermined mapping relationship with the logical resource unit, and the logical resource unit is obtained by reorganizing physical resource unit parts, the physical resource unit part is a partial physical resource obtained by dividing a physical uplink shared channel (PUSCH) physical resource; and
    detecting the message A in the physical resource unit part included in the logical resource unit;
    wherein physical resource unit parts included in the same logical resource unit are from different PUSCH physical resources and different logical resource units comprise partially overlapped physical resource unit parts.

8. The method of claim 7, wherein different logical resource units comprise the same physical resource unit part or different physical resource unit parts.

9. The method of claim 7, wherein the physical resource unit part is the partial physical resource obtained by dividing the PUSCH physical resource using at least one of a time division mode and a frequency division mode.

10. The method of claim 7, wherein the preamble has a predetermined one-to-one mapping relationship with the logical resource unit, or the preamble has a predetermined one-to-many mapping relationship with the logical resource unit.

11. The method of claim 10, wherein the preamble has the predetermined one-to-many mapping relationship with the logical resource unit,
    determining the logical resource unit for transmitting the message A based on the preamble of the message A comprises one of the following:
    randomly selecting the logical resource unit for transmitting the message A from a plurality of logical resource units corresponding to the preamble; and
    selecting a logical resource unit matching a preset rule from a plurality of logical resource units corresponding to the preamble based on the preset rule as the logical resource unit for transmitting the message A.

12. The method of claim 11, wherein the preset rule comprises at least one of a preset matching rule between channel conditions and logical resource units and a preset matching rule between modulation and coding schemes (MCSs) and logical resource units.

13. A random access device, comprising:
    a processor;
    a memory storing instructions executable by the processor;
    wherein, the processor is configured to perform the random access method according to claim 7.

14. A random access device, comprising:
    a processor;
    a memory storing instructions executable by the processor;
    wherein, the processor is configured to perform a random access method comprising:
    selecting a preamble of a message A;
    determining a logical resource unit for transmitting the message A based on the preamble of the message A, wherein the preamble has a predetermined mapping relationship with the logical resource unit, and the logical resource unit is obtained by reorganizing physical resource unit parts, the physical resource unit part is a partial physical resource obtained by dividing a physical uplink shared channel (PUSCH) physical resource; and
    transmitting the message A through the physical resource unit part included in the logical resource unit;
    wherein physical resource unit parts included in the same logical resource unit are from different PUSCH physical resources and different logical resource units comprise partially overlapped physical resource unit parts.

15. The device of claim 14, wherein the physical resource unit part is the partial physical resource obtained by dividing the PUSCH physical resource using at least one of a time division mode and a frequency division mode.

16. The device of claim 14, wherein the preamble has a predetermined one-to-one mapping relationship with the logical resource unit, or the preamble has a predetermined one-to-many mapping relationship with the logical resource unit.

17. The device of claim 16, wherein, the preamble has the predetermined one-to-many mapping relationship with the logical resource unit, determining the logical resource unit for transmitting the message A based on the preamble of the message A comprises one of the followings:

randomly selecting the logical resource unit for transmitting the message A from a plurality of logical resource units corresponding to the preamble; and selecting a logical resource unit matching a preset rule from a plurality of logical resource units corresponding to the preamble based on the preset rule as the logical resource unit for transmitting the message A.

18. The device of claim 17, wherein the preset rule comprises at least one of a preset matching rule between channel conditions and logical resource units and a preset matching rule between modulation and coding schemes (MCSs) and logical resource units.

* * * * *